(12) United States Patent
Liu et al.

(10) Patent No.: US 12,662,151 B2
(45) Date of Patent: Jun. 23, 2026

(54) DRIVER FATIGUE STATE MONITORING SYSTEM BASED ON SEAT PRESSURE-BEARING ANALYSIS

(71) Applicant: THE THIRD RESEARCH INSTITUTE OF MINISTRY OF PUBLIC SECURITY, Shanghai (CN)

(72) Inventors: Caixia Liu, Shanghai (CN); Xiang Shen, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 42 days.

(21) Appl. No.: 18/712,822

(22) PCT Filed: Nov. 4, 2022

(86) PCT No.: PCT/CN2022/129878
§ 371 (c)(1),
(2) Date: May 23, 2024

(87) PCT Pub. No.: WO2023/236437
PCT Pub. Date: Dec. 14, 2023

(65) Prior Publication Data
US 2025/0026362 A1      Jan. 23, 2025

(30) Foreign Application Priority Data
Jun. 7, 2022     (CN) .......................... 202210642182.7

(51) Int. Cl.
*G08B 23/00*          (2006.01)
*B60N 2/00*          (2006.01)
(Continued)

(52) U.S. Cl.
CPC ........... *B60W 50/14* (2013.01); *B60N 2/0023* (2023.08); *B60W 10/18* (2013.01);
(Continued)

(58) Field of Classification Search
CPC .... B60W 50/14; B60W 10/18; B60W 30/146; B60W 40/08; B60W 2040/0818;
(Continued)

(56) References Cited

U.S. PATENT DOCUMENTS

2017/0327124 A1* 11/2017 Kim ...................... B60N 2/0035
2020/0307646 A1* 10/2020 Kato ...................... B60W 50/00
(Continued)

FOREIGN PATENT DOCUMENTS

CN          106976460          7/2017
CN          108819947          11/2018
(Continued)

OTHER PUBLICATIONS

Liu, Caixia; International Search Report and Written Opinion for PCT/CN2022/129878, filed Nov. 4, 2022, mailed Dec. 15, 2022, 14 pages.

*Primary Examiner* — Anh V La
(74) *Attorney, Agent, or Firm* — Fennemore Craig, P.C.

(57) ABSTRACT

The present invention discloses a driver fatigue state monitoring system based on seat pressure analysis. The system collects driver seat pressure sensor monitoring data in real time and performs intelligent analysis, and controls a vehicle running state and sends an alarm prompt based on an analysis determination result. The driver fatigue state monitoring system provided in the present invention can monitor a fatigue state of a driver in real time during driving, and realize automatic leakage control of a driving state of a vehicle and form a safety warning to the driver in an active driving assistance safety prevention and control manner according to a monitoring result, thereby ensuring the traffic safety of various types of vehicles from the perspective of the driver.

11 Claims, 2 Drawing Sheets

(51) Int. Cl.

| | |
|---|---|
| *B60W 10/18* | (2012.01) |
| *B60W 30/14* | (2006.01) |
| *B60W 40/08* | (2012.01) |
| *B60W 50/14* | (2020.01) |

(52) U.S. Cl.
CPC .......... *B60W 30/146* (2013.01); *B60W 40/08* (2013.01); *B60W 2040/0818* (2013.01); *B60W 2050/143* (2013.01); *B60W 2540/229* (2020.02)

(58) Field of Classification Search
CPC ..... B60W 2050/143; B60W 2540/229; B60W 50/087; B60W 2040/0827; B60W 2540/221; B60W 2540/223; B60N 2/0023; G08B 21/06; G08B 7/06; B60K 28/06; B60K 28/066

USPC ......... 340/576, 575, 574, 573.1, 573.7, 439, 340/438
See application file for complete search history.

(56) References Cited

U.S. PATENT DOCUMENTS

| | | | | |
|---|---|---|---|---|
| 2021/0023966 | A1* | 1/2021 | Kanegae | B60N 2/0276 |
| 2021/0053488 | A1* | 2/2021 | Ochoa Nieva | B60Q 1/52 |
| 2021/0101604 | A1* | 4/2021 | Sato | B60R 16/037 |
| 2021/0229677 | A1* | 7/2021 | Sugiyama | B60W 30/08 |

FOREIGN PATENT DOCUMENTS

| | | |
|---|---|---|
| CN | 114834474 | 8/2022 |
| CN | 115035687 | 9/2022 |
| JP | 2018169657 | 11/2018 |

\* cited by examiner

DRIVER FATIGUE STATE MONITORING SYSTEM BASED ON SEAT PRESSURE-BEARING ANALYSIS

CROSS-REFERENCE TO RELATED APPLICATIONS

The present application is a National Stage application of PCT international application: PCT/CN2022/129878, filed on 4 Nov. 2022, the disclosure of which is hereby incorporated by reference in its entirety.

TECHNICAL FIELD

The present invention relates to automobile driving safety monitoring technologies and sensor network technologies, and specifically, to driving safety monitoring of all operational vehicles, non-operational transport vehicles and private vehicles such as highway passenger transportation, tourist transportation, hazardous chemicals transport vehicles, freight vehicles, school buses, buses, taxis, and online car-hailing vehicles or rental vehicles of various platforms.

BACKGROUND

With the rapid development of society and economy, the total mileage of highway in China has increased rapidly, and various types of vehicles on the roads are also increasing. With the development of transportation industry and the increase of car ownership, the number of road traffic accidents is also rising.

Among three elements of human, car and road environment that cause traffic accidents, human factors account for more than 55%, of which traffic accidents caused by fatigue driving of drivers account for nearly 50%.

Studies have shown that after a long period of continuous driving, a driver develops fatigue and boredom, which leads to physiological and psychological dysfunction and a decline in driving skills objectively. Fatigue driving affects attention, feeling, perception, thinking, judgment, will, decision, and movement of the driver, and also leads to a decrease in the sensing capability of the driver, causing the driver to feel distracted, be unresponsive, and react slow, which easily leads to traffic accidents.

At present, tourist chartered buses, liner buses, and dangerous goods transport vehicles are required to be equipped with a vehicle terminal. A fatigue driving alarm stipulated in the transportation industry standard JT/T 794-2019 "Technical Requirements for Road Transport Vehicle Satellite Positioning System Vehicle Terminal" is triggered when single continuous driving time or a cumulative driving time of a vehicle or a driver exceeds a fatigue driving time threshold and the standard stipulates that the fatigue driving time can be remotely set by a monitoring center, the single continuous driving time is 4 h by default, and the cumulative driving time is 8 h by default. According to this provision, whether a driver has been driving for a long time before driving the current vehicle and a true fatigue level when driving the current vehicle cannot be determined, which may cause the driver to be actually in a fatigue driving state before the fatigue driving alarm stipulated in JT/T 794-2019 is triggered. Further, due to fatigue driving, the driver develops fatigue, inattention, slow response, decreased judgment, increased operational errors, and even trance, causing serious traffic accidents such as collisions, overturns, and falls.

Therefore, how to effectively monitor and actively intervene in accident risks that may be caused by driver fatigue driving through effective technical means, and effectively improve the driving safety of all operational vehicles, non-operational transport vehicles, private vehicles, and other driving vehicles, especially the driving safety of tourist chartered buses, liner buses, dangerous goods transport vehicles, freight vehicles, and school buses, which may lead to more serious consequences once an accidents occurs, is a problem to be resolved urgently.

SUMMARY

For the current road traffic safety accidents mostly caused by human factors, and the existing problems and loopholes in vehicle terminal applications used for operational vehicle safety supervision, it is necessary to provide a driving safety management scheme that can effectively monitor whether a driver of a vehicle is fatigued, to effectively monitor and actively intervene in accident risks caused by the driver, to overcome technical defects in safety supervision of existing various operational vehicles, make up for the risk loopholes in an existing application scheme, and eliminate safety hazards caused by the driver.

In view of this, an objective of the present invention is to provide a driver fatigue state monitoring system based on seat pressure analysis, which uses sensor network technologies to collect pressure state and pressure distribution information of a driver seat, performs fatigue analysis on the collected information using an intelligent algorithm, and realizes linkage between an analysis result and vehicle control, thereby providing effective warning and active intervention on the accident risks potentially caused by driver factors, preventing the driver from driving the vehicle in a fatigue state that impairs safe driving, ensuring that the driver is driving the vehicle in a normal mental and physical state, and ensuring active intelligent safety prevention and control of the vehicle when the driver is in a fatigue state, to improve the vehicle running safety.

In order to achieve the above objective, the driver fatigue state monitoring system based on seat pressure analysis provided in the present invention includes:

a seat pressure sensing and monitoring unit, where the seat pressure sensing and monitoring unit is configured to collect driver seat pressure sensor monitoring data in real time and send the collected pressure sensor monitoring data to a sensing and monitoring data analysis unit for intelligent analysis;

the sensing and monitoring data analysis unit, where the sensing and monitoring data analysis unit is configured to perform intelligent analysis on the pressure sensor monitoring data collected by the seat pressure sensing and monitoring unit, determine a current fatigue state of a driver, and based on a real-time fatigue state determination result, link the vehicle control unit to control a vehicle running state and link the alarm prompt unit to send an alarm prompt;

the vehicle control unit, where the vehicle control unit is linked with a starting system, a speed control system, and a braking system of a vehicle, and is linked with the sensing and monitoring data analysis unit, and the vehicle control unit controls a vehicle driving state based on the real-time fatigue state determination result of the driver sent by the sensing and monitoring data analysis unit; and the alarm prompt unit, where the alarm prompt unit is respectively connected to and coordinated with the sensing and monitoring data analysis unit, and sends an alarm and/or a voice prompt based on the real-time fatigue state determination result of the driver sent by the sensing and monitoring data analysis unit.

Further, the seat pressure sensing and monitoring unit includes a pressure state collection device reasonably distributed in a back, a surface, and an armrest of a seat.

The seat pressure state collection device is configured to collect a body movement frequency of the driver and pressure distribution of different point locations of the seat under the driver.

Further, the seat pressure state collection device includes, but is not limited to, a piezoelectric pressure sensor, a piezoresistive pressure sensor, a strain pressure sensor, or an electrostatic capacitive pressure sensor.

Further, the seat pressure sensing and monitoring unit is directly linked with the sensing and monitoring data analysis unit, to send data collected by the related pressure sensors of the seat pressure sensing and monitoring unit to the sensing and monitoring data analysis unit in a wireless communication or wired communication manner.

Further, the sensing and monitoring data analysis unit includes a fatigue state analysis module deployed inside a seat or a fatigue state analysis module independently disposed outside the seat.

The fatigue state analysis module is configured to perform intelligent analysis and identification on the pressure distribution of different point locations of the seat under the driver and the body movement frequency displayed by pressure changes in different point locations collected by the seat pressure sensing and monitoring unit, to determine a fatigue level of a current real-time state of the driver.

Further, the fatigue state analysis module includes a data storage device and an edge computing device.

The data storage device is configured to store collected data of the seat pressure sensing and monitoring unit.

The edge computing device is configured to perform intelligent computational analysis on the collected data of the seat pressure sensing and monitoring unit.

Further, the sensing and monitoring data analysis unit is directly linked with the seat pressure sensing and monitoring unit, the vehicle control unit, and an alarm prompt unit. When a driver fatigue state analysis result of the sensing and monitoring data analysis unit on the collected data of the seat pressure sensing and monitoring unit is abnormal, the vehicle control unit is linked to control speed limit, deceleration, or emergency braking of the vehicle and the alarm prompt unit is linked to send an acousto-optic alarm or a voice prompt.

Further, the vehicle control unit includes an antilock braking module and/or a speed limit management module and/or an intelligent brake management module and/or an electronic brake assist module.

The antilock braking module is configured to prevent a possible runaway or sideways slip of the vehicle during emergency braking when a received driver state monitoring result is abnormal.

The speed limit management module is configured to control a maximum driving speed of the vehicle when the received driver state monitoring result is abnormal.

The intelligent brake management module is configured to activate an intelligent brake device when the received driver state monitoring result is abnormal, to reduce a real-time driving speed of the vehicle.

The electronic brake assist module is configured to quickly activate all braking forces when the received driver state monitoring result is abnormal, which requires emergency braking.

Further, the vehicle control unit is directly linked with the sensing and monitoring data analysis unit. When the vehicle control unit receives an abnormal driver fatigue state monitoring result sent by the sensing and monitoring data analysis unit, the vehicle control unit controls speed limit, deceleration, or emergency braking of the vehicle.

Further, the alarm prompt unit comprises an in-cab acousto-optic alarm module, an in-cab voice prompt module, an out-cab acousto-optic alarm module, and an out-cab voice prompt module.

The in-cab acousto-optic alarm module is configured to send an acousto-optic alarm when a driver fatigue state determination result is abnormal.

The in-cab voice prompt module is configured to send a voice prompt when the driver fatigue state determination result is abnormal.

The out-cab acousto-optic alarm module is configured to send an acousto-optic alarm when the driver fatigue state determination result is seriously abnormal.

The out-cab voice prompt module is configured to send a voice prompt when the driver fatigue state determination result is seriously abnormal.

Further, the alarm prompt unit is directly linked with the sensing and monitoring data analysis unit. When the alarm prompt unit receives the abnormal driver fatigue state monitoring result sent by the sensing and monitoring data analysis unit, the alarm prompt unit controls the in-cab and outer-cab acousto-optic alarm modules and voice prompt modules to send acousto-optic alarms and voice prompts respectively.

The driver fatigue state monitoring system based on seat pressure analysis provided in the present invention can monitor the fatigue state of the driver in real time during driving, and automatically control the driving state of the vehicle and form a safety warning to the driver in an active driving assistance safety prevention and control manner based on the monitoring result, thereby ensuring the vehicle running safety from the perspective of the driver.

Specifically, the driver fatigue state monitoring system based on seat pressure analysis provided in the present invention collects the body movement frequency of the driver and the pressure state monitoring information of different parts of the seat under the driver in real time, performs intelligent data mining and analysis by means of sensor network monitoring data analysis, determines the real-time fatigue state of the driver, links the vehicle control unit to perform operations such as automatic speed control, deceleration, and braking, sends an acousto-optic alarm or voice prompt through the alarm prompt unit, to prevent the driver from driving the vehicle in a fatigue state of slow response, and performs active intelligent safety prevention and control when the driver is in a fatigue state to reduce the risk of traffic accidents.

BRIEF DESCRIPTION OF THE DRAWINGS

The present invention is further described below with reference to the accompanying drawings and specific implementations.

DETAILED DESCRIPTION

To make the implemented technical means, inventive features, and achieved objectives and effects of the present invention comprehensible, the present invention is further described below with reference to the specific drawings.

An existing vehicle terminal for operational vehicle supervision can only monitor a fatigue state of a driver of a vehicle according to the continuous driving time to determine whether the driver is driving in a fatigue state. The monitored data is only used for subsequent administrative management, and it is impossible to achieve real-time monitoring of the fatigue level of the driver, and more impossible to achieve real-time warning and intervention in the fatigue state of the driver.

In view of this, the present invention innovatively cuts in from the state of the driver, to realize real-time monitoring on the real-time fatigue state during driving of the driver, and realize linkage control of the driving state of the vehicle in real time and/or form a safety warning to the driver according to the monitoring result. In this way, intelligent warning of safety hazards that may be caused by the fatigue driving of the driver is realized, and linkage control of the driving state of the vehicle is realized, thereby eliminating the safety hazards caused by the fatigue driving of the driver, and ensuring the transportation safety of the corresponding vehicle from the management perspective of the driver.

Accordingly, the present invention provides a driver fatigue state monitoring system based on seat pressure analysis. The monitoring system can monitor a body movement frequency of a driver during driving and pressure distribution of different parts of the seat under the driver in real time, rigorously determine a real-time fatigue level of the driver, automatically control the automatic speed limit, deceleration or emergency braking of the vehicle based on an analysis and identification result of the real-time fatigue state, and send a voice prompt or acousto-optic alarm, and provide effective warning and active intervention in accident risks that may be caused by the fatigue driving of the driver, to prevent the driver from driving the vehicle in a fatigue state, ensure that the driver is safely driving the vehicle in a normal physical condition, ensure active and intelligent safety prevention and control of the vehicle when the driver is in a fatigue state, and prevent the traffic safety accident of the corresponding vehicle.

Figure 1:
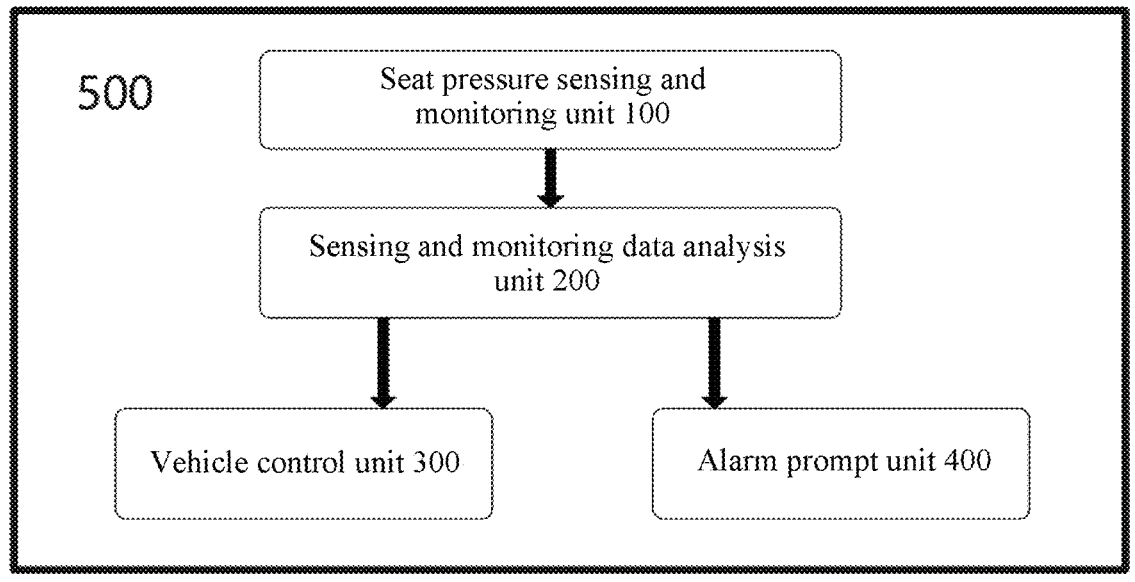
FIG. 1 is a schematic diagram of a composition principle and a usage procedure of a driver fatigue state monitoring system based on seat pressure analysis according to an embodiment of the present invention.

FIG. 1 is a schematic diagram of an overall composition principle of a driver fatigue state monitoring system based on seat pressure analysis given by the present invention.

Based on FIG. 1, the driver fatigue state monitoring system based on seat pressure analysis is mainly composed of a seat pressure sensing and monitoring unit 100, a sensing and monitoring data analysis unit 200, a vehicle control unit 300, and an alarm prompt unit 400.

The seat pressure sensing and monitoring unit 100 in the system is disposed in a surface, a back, and an armrest of a seat in a cab of a to-be-monitored vehicle 500, and is linked with the sensing and monitoring data analysis unit 200.

The seat pressure sensing and monitoring unit 100 can collect a body movement frequency of a driver and pressure distribution of different point locations of the seat under the driver, and send data collected by related pressure sensors of the seat pressure sensing and monitoring unit to the sensing and monitoring data analysis unit in a wireless communication or wired communication manner.

As an example, the to-be-monitored vehicle 500 herein may be various vehicles, such as various types of operational vehicles and private vehicles. The operational vehicles include tourist chartered buses, liner buses, dangerous goods transport vehicles, freight vehicles, and school buses, and further include taxis, and various types of online car-hailing vehicles or rental vehicles (such as Didi and China Auto Rental).

The sensing and monitoring data analysis unit 200 in the system is disposed in the cab of the to-be-monitored vehicle 500, and is linked with the seat pressure sensing and monitoring unit 100, the vehicle control unit 300, and the alarm prompt unit 400.

A fatigue state analysis module of the sensing and monitoring data analysis unit 200 may be deployed inside a seat or independently outside the seat as needed to perform intelligent analysis and identification on the pressure distribution of different point locations of the seat under the driver and the body movement frequency displayed by pressure changes in different point locations collected by the seat pressure sensing and monitoring unit 100, to determine a fatigue level of a current real-time state of the driver.

In addition, the sensing and monitoring data analysis unit 200 can be directly linked with the vehicle control unit 300 and the alarm prompt unit 400 based on a real-time fatigue state determination result, to control an antilock braking (ABS) module, a speed limit management module, an intelligent brake management module, or an electronic brake assist (EBA) module of the vehicle through the vehicle control unit 300 to perform speed limit, speed control, or deceleration operations, and send an acousto-optic alarm or voice prompt through the alarm prompt unit 400.

As an example, the seat pressure sensing and monitoring unit 100 and the sensing and monitoring data analysis unit 200 in the system innovatively collect pressure state monitoring information of different point locations of the seat under the driver, and perform intelligent analysis and identification on the pressure distribution in different regions of the seat under the driver and pressure changes in different point locations collected by a seat pressure collection device in real time, determine the real-time fatigue state of the driver, and/or link the vehicle control unit to perform operations such as automatic speed control and deceleration, and send an acousto-optic alarm or voice prompt through the alarm prompt unit.

Further, when the sensing and monitoring data analysis unit 200 performs intelligent analysis and identification, a corresponding edge computing module may be directly constructed in the sensing and monitoring data analysis unit 200 to perform intelligent analysis and identification on the fatigue level of the real-time state of the driver.

In this way, when the sensing and monitoring data analysis unit 200 is in operation, the real-time fatigue state may be determined by the edge computing module constructed in the sensing and monitoring data analysis unit 200 for the data collected by the seat pressure sensing and monitoring unit 100. In addition, the sensing and monitoring data analysis unit 200 generates a corresponding vehicle management instruction based on the real-time fatigue state determination result, and directly linked with the vehicle control unit 300, thereby controlling the working state of the antilock braking (ABS) module, the speed limit management module, the intelligent brake management module, or the electronic brake assist (EBA) module of the vehicle to perform speed limit, deceleration, or emergency braking operations to achieve the management and control of the vehicle running state.

Moreover, the sensing and monitoring data analysis unit 200 in the system can further generate a corresponding warning instruction based on the real-time fatigue state determination result, and be directly linked with the alarm prompt unit 400 in the system, and the alarm prompt unit 400 in the system may send an acousto-optic alarm or voice prompt based on the corresponding warning instruction, thereby realizing different warnings based on different fatigue levels of the driver.

Figure 2:
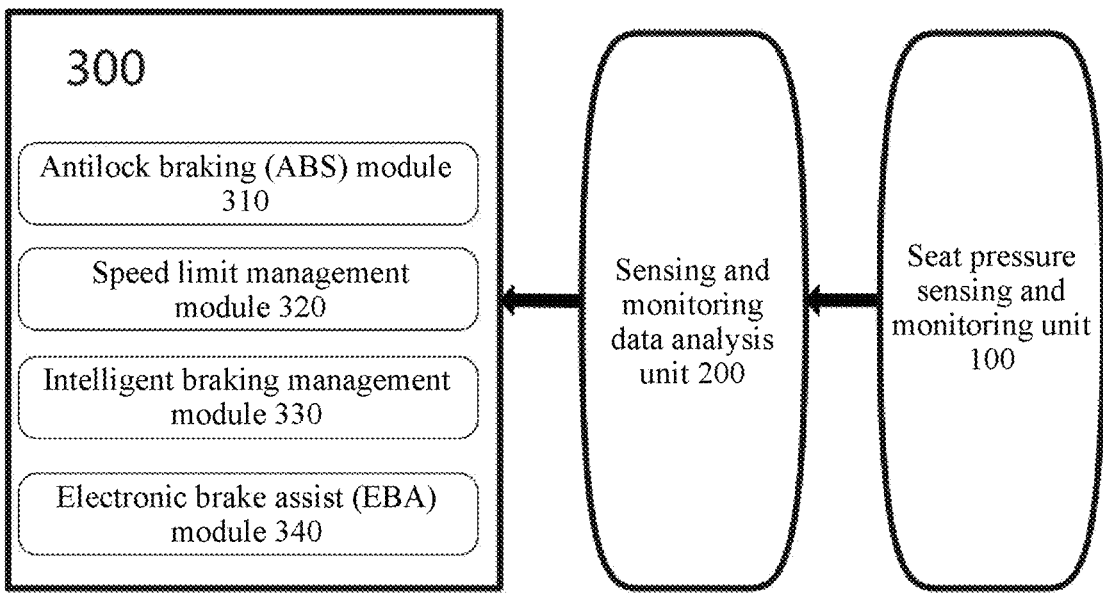
FIG. 2 is a schematic diagram of a composition principle and a usage procedure of a vehicle control unit according to an embodiment of the present invention.

FIG. 2 is a schematic diagram of a composition principle and a usage procedure of the vehicle control unit 300 of the driver fatigue state monitoring system according to this embodiment.

Based on FIG. 2, the vehicle control unit 300 in this embodiment is composed of an antilock braking (ABS) module 310 and/or a speed limit management module 320 and/or an intelligent brake management module 330 and/or an electronic brake assist (EBA) module 340 in combination or independently.

Based on FIG. 1 and FIG. 2, the vehicle control unit 300 in the system is disposed in the to-be-monitored vehicle 500, and is linked with the sensing and monitoring data analysis unit 200 in the vehicle.

Specifically, the vehicle control unit 300 is disposed in a cab of a car or an engine compartment of a car, and a starting system, linked with a speed control system, and a braking system of the vehicle, and linked with the sensing and monitoring data analysis unit 200.

The vehicle control unit 300 can control speed limit, deceleration, or emergency braking of the vehicle based on a fatigue state determination result sent by the sensing and monitoring data analysis unit 200.

Based on FIG. 1 and FIG. 2, the vehicle control unit 300 is disposed in this way may use the antilock braking (ABS) module 320 to receive a driver fatigue state monitoring result sent by the sensing and monitoring data analysis unit 200 and prevent a possible runaway or sideways slip of the vehicle during emergency braking.

The vehicle control unit 300 may use the speed limit management module 330 to receive the driver fatigue state monitoring result sent by the sensing and monitoring data analysis unit 200 and control a maximum driving speed of the vehicle.

The vehicle control unit 300 may use the intelligent brake management module 340 to receive the driver fatigue state monitoring result sent by the sensing and monitoring data analysis unit 200 and activate an intelligent braking device to reduce a real-time driving speed of the vehicle.

The vehicle control unit 300 may use the electronic brake assist (EBA) module 350 to receive the driver fatigue state monitoring result sent by the sensing and monitoring data analysis unit 200 and quickly activate all braking forces when emergency braking is required, to prevent traffic accidents due to excessive braking distances caused by the driver being unresponsive in an abnormal state.

Figure 3:
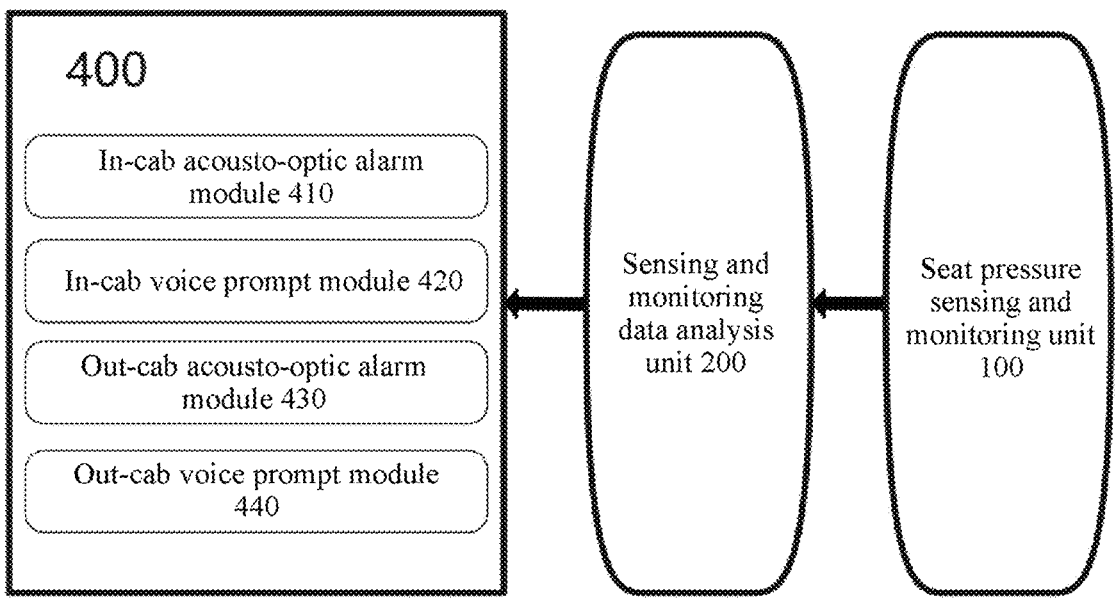
FIG. 3 is a schematic diagram of a composition principle and a usage procedure of an alarm prompt unit according to an embodiment of the present invention.

FIG. 3 is a schematic diagram of a composition principle and a usage procedure of the alarm prompt unit 400 in the driver fatigue state monitoring system based on the seat pressure analysis according to this embodiment.

Based on FIG. 3, the alarm prompt unit 400 in this embodiment is composed of vehicle local alarm prompting sub-units such as an in-cab acousto-optic alarm module 410, an in-cab voice prompt module 420, an out-cab acousto-optic alarm module 430, and an out-cab voice prompt module 440.

Further, referring to FIG. 3, when the alarm prompt unit 400 in this embodiment is specifically deployed in coordination with the sensing and monitoring data analysis unit 200, the alarm prompt unit 400 is deployed by using a local alarm scheme, may be preferably arranged inside the cab of the vehicle and outside the vehicle, and may be directly linked with the sensing and monitoring data analysis unit 200 to receive information sent by the sensing and monitoring data analysis unit 200 in a wired communication or wireless communication manner.

Based on FIG. 1 and FIG. 3, the in-cab acousto-optic alarm module 410 in the alarm prompt unit 400 sends an acousto-optic alarm when receiving an abnormal driver fatigue state determination result sent by the sensing and monitoring data analysis unit 200. As an example, the light emitted by the acousto-optic alarm of the acousto-optic alarm module is generally red in default.

The in-cab voice prompt module 420 prompts the driver to concentrate or stop nearby when receiving the abnormal driver fatigue state determination result sent by the sensing and monitoring data analysis unit 200. As an example, the in-cab voice prompt module 420 herein and the in-cab acousto-optic alarm module may be disposed independently or combined into a voice acousto-optic alarm.

The out-cab acousto-optic alarm module 430 sends an acousto-optic alarm to the crowd outside the vehicle when the received driver fatigue state determination result sent by the sensing and monitoring data analysis unit 200 is seriously abnormal. As an example, light emitted by the acousto-optic alarm of the acousto-optic alarm module is generally red in default, and the volume of the alarm sound is sufficient to alert passers-by in a noisy environment on the road.

The out-cab voice prompt module 440 sends a voice prompt to the crowd outside the vehicle when the received driver fatigue state determination result sent by the sensing and monitoring data analysis unit 200 is seriously abnormal. As an example, the volume of the voice prompt and the alarm sound generated by the out-cab voice prompt module 440, is sufficient to cause a high level of alertness to passers-by in a noisy environment on the road, and the intelligibility of the voice broadcast of the voice warning content is sufficient for the listener to clearly understand.

The alarm prompt unit 400 in the system may adopt a local alarm scheme, and may adopt a remote alarm scheme as needed. As a preferred solution, the local alarm scheme is preferably adopted herein, and as an example, a local acousto-optic alarm or a voice prompting device may be included.

On this basis, the present invention further clarifies the specific devices that may be involved in the corresponding unit component modules in the driver fatigue state monitoring system based on seat pressure analysis.

The seat pressure state collection device in the seat pressure sensing and monitoring unit 100 is configured to collect the pressure distribution of different point locations of the seat under the driver and the pressure changes in different point locations. The seat pressure state collection device includes, but is not limited to, an external seat cushion laid on the seat, a pressure sensor on the backrest, and an embedded pressure sensor built into the seat.

In addition, the type of the seat pressure state collection device varies according to technical principles, including but not limited to a piezoelectric sensor, a piezoresistive sensor, and a strain sensor. It is specifically determined according to the installation conditions of the vehicle and the management requirements of the carrier, and is not limited herein.

A data storage device in the sensing and monitoring data analysis unit 200 is configured to store collected data of the seat pressure sensing and monitoring unit, and an edge computing device is configured to perform intelligent computational analysis on the collected data of the seat pressure sensing and monitoring unit. The analysis includes at least intelligent analysis on the pressure distribution of the seat surface, the seat back, and the armrest and analysis on the body movement frequency of the pressure changes in different point locations. The accurate determination of the fatigue level of the current real-time state of the driver is realized through the organic combination of the two methods.

The installation locations of the data storage device and the edge computing device are determined according to the installation conditions of the vehicle and the management requirements of the carrier, and are not limited herein.

The driver fatigue state monitoring system based on seat pressure analysis formed in this way can monitor the fatigue state of the driver in real time and accurately during the driving of the vehicle when the system is deployed and operated in the to-be-monitored vehicle, realize automatic leakage control of the driving state of the vehicle and form a safety warning to the driver in an active driving assistance safety prevention and control manner based on the monitoring result, and prevent unsafe driving behaviors due to excessive fatigue of the driver, thereby further ensuring the vehicle driving safety.

Finally, it should be noted that, the above-described methods of the present invention, or a specific system unit, or a portion thereof, may be arranged in a physical medium, such as a hard disk, a CD-ROM, or any electronic device (such as a smartphone or a computer-readable storage medium) through program code. When a machine (such as a smartphone) loads and executes the program code, the machine becomes a device for implementing the present invention. The above-described methods and devices of the present invention can also be transmitted in a program code mode through some transmission media, such as cables, optical fibers, or any transmission mode. When the program code is received, loaded, and executed by a machine (such as a smartphone), the machine becomes a device for implementing the present invention.

The foregoing displays and describes basic principles, main features, and advantages of the present invention. A person skilled in the art should understand that the present invention is not limited to the foregoing embodiments. Descriptions in the embodiments and this specification only illustrate the principles of the present invention. Various modifications and improvements made to the present invention without departing from the spirit and the scope of the present invention shall fall within the protection scope of the present invention. The protection scope of the present invention is subject to the appended claims and the equivalent thereof.

What is claimed is:

1. A driver fatigue state monitoring system based on seat pressure analysis, comprising:

a seat pressure sensing and monitoring unit, wherein the seat pressure sensing and monitoring unit is configured to collect driver seat pressure sensor monitoring data in real time and send the collected pressure sensor monitoring data to a sensing and monitoring data analysis unit for intelligent analysis; and a fatigue state analysis module of the sensing and monitoring data analysis unit to perform intelligent analysis and identification on pressure distribution of different point locations and a body movement frequency displayed by pressure changes in different point locations to determine a fatigue level of a current real-time state of a driver;

the sensing and monitoring data analysis unit, wherein the sensing and monitoring data analysis unit is configured to perform intelligent analysis on the pressure sensor monitoring data collected by the seat pressure sensing and monitoring unit, determine a current fatigue state of the driver, and based on a real-time fatigue state determination result, link a vehicle control unit to control a vehicle running state and link an alarm prompt unit to send an alarm prompt;

the vehicle control unit, wherein the vehicle control unit is linked with a starting system, a speed control system, and a braking system of a vehicle, and is linked with the sensing and monitoring data analysis unit, and the vehicle control unit controls a vehicle driving state based on the real-time fatigue state determination result of the driver sent by the sensing and monitoring data analysis unit;

the alarm prompt unit, wherein the alarm prompt unit is respectively connected to and coordinated with the sensing and monitoring data analysis unit, and sends an alarm and/or a voice prompt based on the real-time fatigue state determination result of the driver sent by the sensing and monitoring data analysis unit;

the seat pressure sensing and monitoring unit comprises a pressure state collection device reasonably distributed in a back, a surface, and an armrest of a seat, and the seat pressure state collection device is configured to collect the body movement frequency of the driver and pressure distribution of different point locations of the seat under the driver.

2. The driver fatigue state monitoring system according to claim 1, wherein the seat pressure sensing and monitoring unit is directly linked with the sensing and monitoring data analysis unit.

3. The driver fatigue state monitoring system according to claim 1, wherein the sensing and monitoring data analysis unit comprises a fatigue state analysis module deployed inside a seat or a fatigue state analysis module independently disposed outside the seat; and the fatigue state analysis module is configured to perform intelligent analysis and identification on the pressure distribution of different point locations of the seat under the driver collected by the pressure state collection device in the seat pressure sensing and monitoring unit, to determine a fatigue level of a current real-time state of the driver.

4. The driver fatigue state monitoring system according to claim 1, wherein the sensing and monitoring data analysis unit is directly linked with the seat pressure sensing and monitoring unit, the vehicle control unit, and the alarm prompt unit.

5. The driver fatigue state monitoring system according to claim 1, wherein the vehicle control unit comprises an antilock braking module and/or a speed limit management module and/or an intelligent brake management module and/or an electronic brake assist module;

the antilock braking module is configured to prevent a possible runaway or sideways slip of the vehicle during emergency braking when a received driver state monitoring result is abnormal;

the speed limit management module is configured to control a maximum driving speed of the vehicle when the received driver state monitoring result is abnormal;

the intelligent brake management module is configured to activate an intelligent brake device when the received driver state monitoring result is abnormal, to reduce a real-time driving speed of the vehicle; and the electronic brake assist module is configured to quickly activate all braking forces when the received driver state monitoring result is abnormal, which requires emergency braking.

6. The driver fatigue state monitoring system according to claim 1, wherein the vehicle control unit is directly linked with the sensing and monitoring data analysis unit.

7. The driver fatigue state monitoring system according to claim 1, wherein the alarm prompt unit comprises an in-cab acousto-optic alarm module, an in-cab voice prompt module, an out-cab acousto-optic alarm module, and an out-cab voice prompt module;

the in-cab acousto-optic alarm module is configured to send an acousto-optic alarm when a driver fatigue state determination result is abnormal;

the in-cab voice prompt module is configured to send a voice prompt when the driver fatigue state determination result is abnormal;

the out-cab acousto-optic alarm module is configured to send an acousto-optic alarm when the driver fatigue state determination result is seriously abnormal; and the out-cab voice prompt module is configured to send a voice prompt when the driver fatigue state determination result is seriously abnormal.

8. The driver fatigue state monitoring system according to claim 1, wherein the alarm prompt unit is directly linked with a sensing and monitoring data analysis unit.

9. The driver fatigue state monitoring system according to claim 1, wherein:

the seat pressure sensing and monitoring unit is directly linked with the sensing and monitoring data analysis unit, and the sensing and monitoring data analysis unit is directly linked with the seat pressure sensing and monitoring unit, the vehicle control unit, and the alarm prompt unit; the vehicle control unit is directly linked with the sensing and monitoring data analysis unit, and the alarm prompt unit is directly linked with the sensing and monitoring data analysis unit;

and the sensing and monitoring data analysis unit performs intelligent analysis on the collected seat pressure sensing and monitoring data, and when a driver fatigue state analysis result is abnormal, links the vehicle control unit to control speed limit, deceleration, or emergency braking of the vehicle and links an alarm reminder unit to send an acousto-optic alarm or voice prompt.

10. The driver fatigue state monitoring system according to claim 3, wherein the alarm prompt unit is directly linked with a sensing and monitoring data analysis unit.

11. The driver fatigue state monitoring system according to claim 8, wherein:

the seat pressure sensing and monitoring unit is directly linked with the sensing and monitoring data analysis unit, and the sensing and monitoring data analysis unit is directly linked with the seat pressure sensing and monitoring unit, the vehicle control unit, and the alarm prompt unit; the vehicle control unit is directly linked with the sensing and monitoring data analysis unit, and the alarm prompt unit is directly linked with the sensing and monitoring data analysis unit;

and the sensing and monitoring data analysis unit performs intelligent analysis on the collected seat pressure sensing and monitoring data, and when a driver fatigue state analysis result is abnormal, links the vehicle control unit to control speed limit, deceleration, or emergency braking of the vehicle and links an alarm reminder unit to send an acousto-optic alarm or voice prompt.

* * * * *